(12) United States Patent
Audibert et al.

(10) Patent No.: US 7,066,679 B2
(45) Date of Patent: Jun. 27, 2006

(54) SHAFT ASSEMBLY SAFETY MECHANISM

(75) Inventors: Kevin Joseph Audibert, Wolcott, CT (US); George David Collon, Oxford, CT (US)

(73) Assignee: Timken US Corporation, Torrington, CT (US)

( * ) Notice: Subject to any disclaimer, the term of this patent is extended or adjusted under 35 U.S.C. 154(b) by 0 days.

(21) Appl. No.: 10/713,780

(22) Filed: Nov. 14, 2003

(65) Prior Publication Data

US 2005/0105966 A1 May 19, 2005

(51) Int. Cl.
*F16D 3/16* (2006.01)
(52) U.S. Cl. .................. 403/355; 403/386; 403/398; 403/399; 464/134
(58) Field of Classification Search ................ 403/332, 403/355, 375, 398, 399, 232.1, 237, 386; 464/134, 182
See application file for complete search history.

(56) References Cited

U.S. PATENT DOCUMENTS

| 5,090,833 | A | * | 2/1992 | Oertle et al. | 403/12 |
| 5,403,111 | A | * | 4/1995 | Wey | 403/378 |
| 5,575,581 | A | * | 11/1996 | DeBisschop | 403/157 |
| 5,580,184 | A | * | 12/1996 | Riccitelli | 403/365 |
| 5,628,578 | A | * | 5/1997 | McClanahan et al. | 403/290 |

* cited by examiner

*Primary Examiner*—Daniel P. Stodola
*Assistant Examiner*—Michael P. Ferguson
(74) *Attorney, Agent, or Firm*—Michael Best & Friedrich LLP

(57) ABSTRACT

A shaft coupling element comprising a first portion configured for connection to a shaft and a second portion configured for connection to a secondary component. The first portion comprises first and second spaced apart side walls with a partial cylindrical portion extending therebetween to define a shaft receiving slot. A safety notch extends through the partial cylindrical portion adjacent the axial opening in to the shaft receiving slot to define a radial opening from the shaft receiving slot.

6 Claims, 3 Drawing Sheets

SHAFT ASSEMBLY SAFETY MECHANISM

BACKGROUND

The present invention relates to shaft components. More particularly, the present invention relates to a safety mechanism for reducing the likelihood of an improper shaft assembly connection.

Shafts are utilized in many applications and generally require interconnection between the shaft and a secondary component. The secondary component can be an independent component or a secondary shaft such that the shaft 20 serves as an intermediate shaft. In both instances, the forward end 22 of the shaft 20 is interconnected with a coupling element 10 which in turn is interconnected with the secondary component (not shown).

Many different coupling elements 10 can be utilized to connect the shaft 20 to the secondary component. One such coupling element 10 is a clamp yoke. An exemplary prior art clamp yoke is illustrated in FIGS. 1 and 2. The clamp yoke has a first portion 11 configured for secure connection to the shaft 20 and a second portion 13 configured for connection to the secondary component. The illustrated second portion 13 includes a yoke 18 extending from the first portion 11 with a securement bore 19 extending through the yoke arms. Other connection means may be utilized in the second portion 13.

The first portion 11 of the clamp yoke has a pair of side walls with a shaft receiving and retaining slot 12 extending therebetween. A retaining bolt 16 is passed through a through bore 14 in the side walls of the first portion 11 and tightened to secure the retaining slot 12 about the shaft 20. Furthermore, as a redundant safety feature, the shaft 20 typically has bolt receiving recess 24 in the form of a notch, an annular groove or other configuration adjacent the forward end 22 of the shaft 20. When the forward end 22 of the shaft 20 is first positioned in the slot 12 (as indicated by the arrow 1 in FIG. 1), the bolt receiving recess 24 is aligned with the through bore 14 and the retaining bolt 16 is slid through the through bore 14 and bolt receiving recess 24 (as indicated by the arrow 2 in FIG. 1) and secured by a cotter pin, nut or the like. The retaining bolt 16 extending through the bolt receiving recess 24 permanently secures the shaft 20 to the coupling element 10 first portion 11.

In many applications, for example, a steering intermediate shaft, the interconnection of the shaft 20 and coupling element 10 occurs in a location with limited accessibility. As such, it is difficult to visually or manually check that the retaining bolt 16 is properly received in the bolt receiving recess 24. For example, as illustrated in FIG. 2, the shaft 20 may not be fully inserted into the retaining slot 12 when the retaining bolt 16 is inserted. As a result, the retaining bolt 16 is not received in the bolt receiving recess 24. In some instances, the forward end 22 of the shaft 20 jams between the inserted retaining bolt 16 and the inner surface 18 of the coupling element slot 12 or, even if not jammed by the retaining bolt 16, the retaining slot 12 is tightened with only the very end 22 of the shaft 20 inserted in to the retaining slot 12. If the shaft 20 is jammed sufficiently or pinched at its very end 22, it may give a rigid feeling to an assembly worker, thereby creating a false sense that the shaft 20 is properly interconnected. After some use, the shaft end 22 may dislodge from between the retaining bolt 16 and slot surface 18 or may loosen from the minimal grip on the forward end 22, thereby causing disassembly and failure of the coupling.

FIGS. 1 and 2 show one prior art method utilized in an effort to minimize improper clamping of the shaft forward end 22. A counter bore 19 is provided about the retaining slot 19. While the counter bore 19 provides some effectiveness, it typically requires a secondary machining process which adds cost to the part. Additionally, the counter bore 19 may lessen the grip of the first portion 11 on the shaft 20 even when the shaft 20 is properly inserted.

SUMMARY

The present invention provides a shaft coupling element comprising a first portion configured for connection to a shaft and a second portion configured for connection to a secondary component. The first portion comprises first and second spaced apart side walls with a partial cylindrical portion extending therebetween to define a shaft receiving slot having an axial opening in to the shaft receiving slot. A through bore extends through the first and second walls. A safety notch extends through the partial cylindrical portion adjacent the axial opening in to the shaft receiving slot to define a radial opening from the shaft receiving slot.

DETAILED DESCRIPTION OF THE PREFERRED EMBODIMENTS

The present invention will be described with reference to the accompanying drawing figures wherein like numbers represent like elements throughout. Certain terminology, for example, "right", "left", "front", "frontward", "forward", "back", "rear" and "rearward", is used in the following description for relative descriptive clarity only and is not intended to be limiting.

Figure 1:
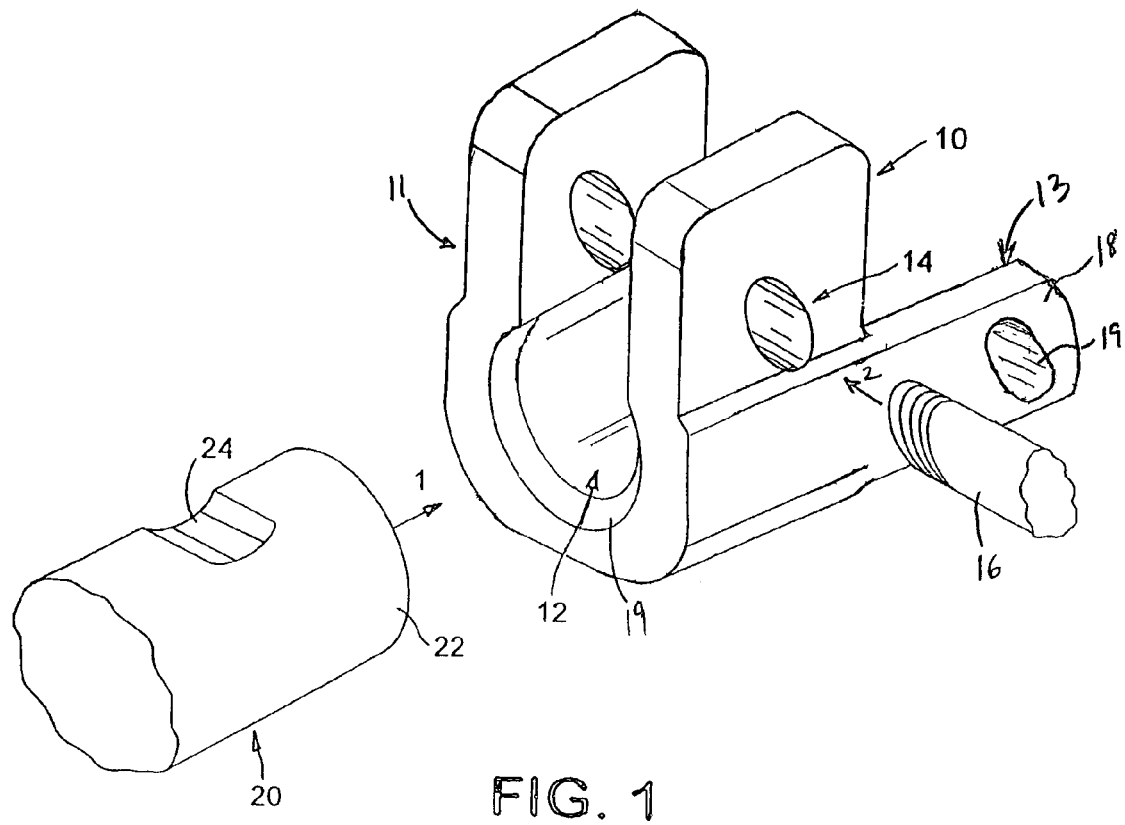
FIG. 1 is an isometric view of a shaft positioned for engagement with an exemplary prior art coupling element.
Figure 2:
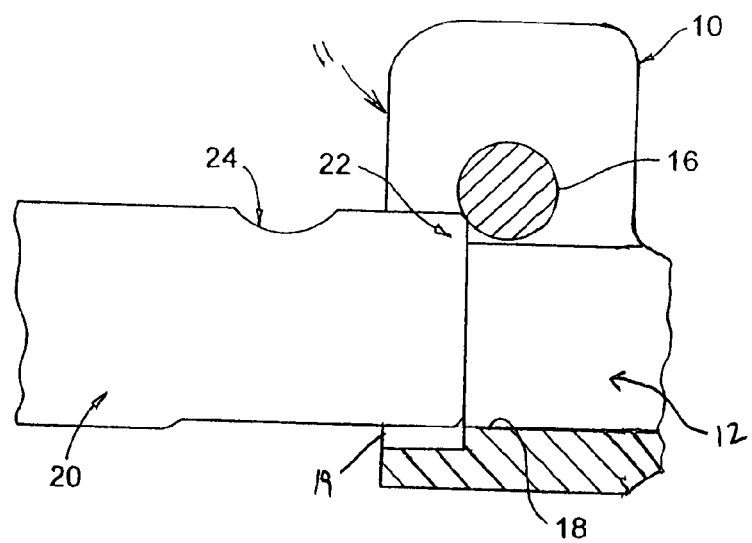
FIG. 2 is a side elevation view, with coupling element shown in cross section the shaft improperly interconnected with the coupling element.
Figure 3:
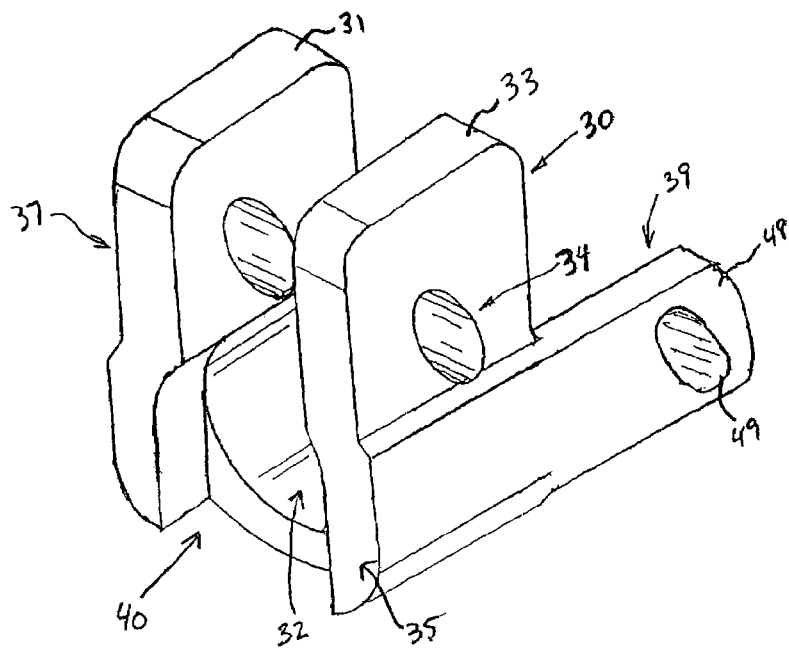
FIG. 3 is an isometric view of a coupling element that is a first embodiment of the present invention.
Figure 4:
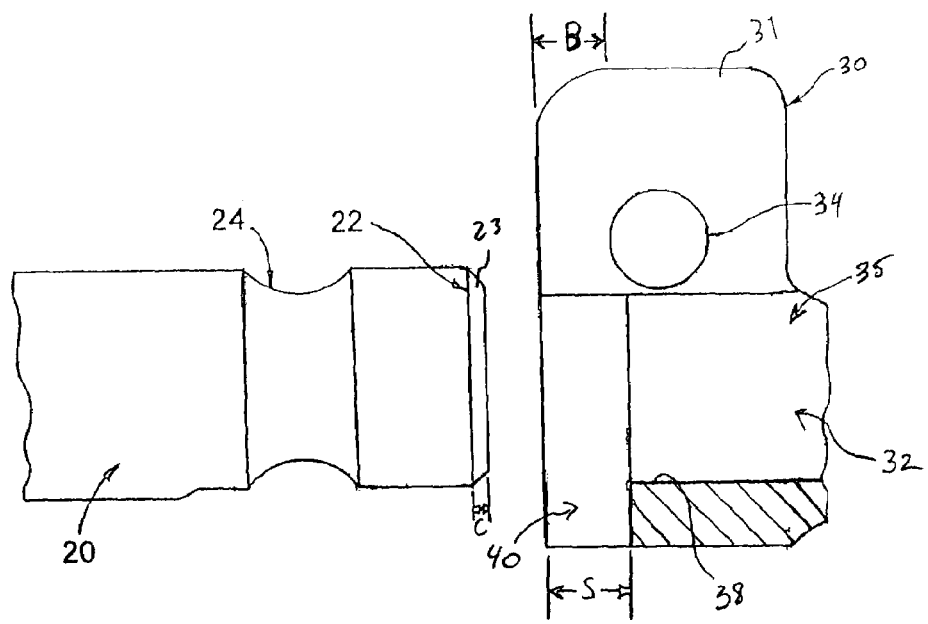
FIG. 4 is a side elevation view of a shaft positioned for engagement with the coupling element of FIG. 3, with the coupling element shown in cross section.

Referring to FIGS. 3 and 4, a coupling element 30 that is a first embodiment of the present invention is shown. The coupling element 30 has a first portion 37 for interconnection with the shaft 20 and a second portion 39 for interconnection with a secondary component. The second portion 39 is illustrated as a yoke, similar to the yoke in the prior art and including a pair of yoke arms 48 (only one visible in the Fig.) and a securement bore 49 extending therethrough. While the second portion 39 is illustrated as a yoke, it may have various other configurations.

The first portion 37 includes a pair of spaced apart side walls 31 and 33 interconnected by a partial cylindrical portion 35 to define a shaft retaining slot 32. The shaft retaining slot 32 can have various configurations, for example, but not limited to, circular, u-shaped, tapered. A bolt receiving bore 34 extends through both side walls 31, 33 and is configured to receive a bolt 16 (not shown in FIGS. 3 and 4). The bolt 16 is positioned through the bore 34 and tightened to bring the side walls 31 and 33 together, thereby reducing the diameter of the retaining slot 32 such that the slot 32 clamps on a shaft 20 positioned therein.

To minimize the potential for the retaining slot 32 to clamp upon the forward end 22 of the shaft 20, a safety notch 40 is provided in the lower surface of the cylindrical portion 35 adjacent the opening into the retaining slot 32. The safety notch 40 extends completely through the cylindrical portion 35 such that a complete open space is provided adjacent the opening in to the retaining slot 32.

Figure 5:
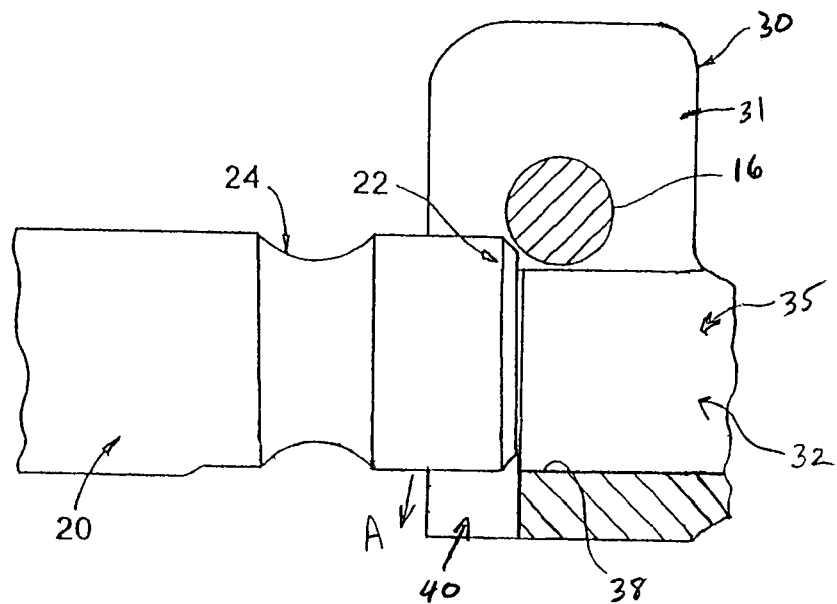
FIG. 5 is a side elevation view similar to FIG. 4, with the shaft improperly positioned within the coupling element of FIG. 3.
Figure 6:
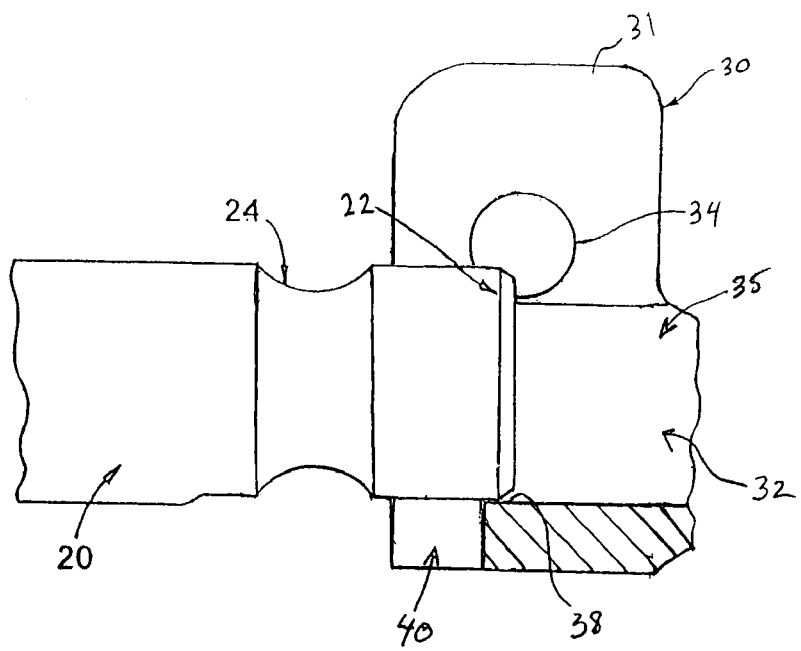
FIG. 6 is a side elevation view similar to FIG. 4, with the shaft partially positioned within the coupling element of FIG. 3.

The safety notch 40 preferably has an axial length S that is longer than the axial distance B from the opening into the retaining slot 32 to the through bore 34. Alternatively, if the shaft 20 has a chamfer 23 on the forward end 22, the axial length S such that the axial length S in combination with the chamfer axial length C is longer than the distance B. In either configuration, if the shaft 20 is not completely inserted, as illustrated in FIG. 5, and the bolt 16 is inserted and tightened, the retaining slot 32 will be unable to clamp onto the shaft forward end 22. Instead, the shaft 20 will move out of the retaining slot 32 via the safety notch 40, as indicated by arrow A in FIG. 5. If the shaft 20 is positioned far enough in to the retaining slot 32 such that the shaft forward end 22 is beyond the safety notch 40 and in contact with the slot lower surface 38, as shown in FIG. 6, the shaft forward end 22 will block the through bore 34, thereby preventing insertion of the bolt 16 until the shaft 20 is properly inserted.

The present invention provides an economic manner of producing a coupling element 30 with the desired safety feature. The coupling element 30 can be produced as a stamped part that is wrapped to the desired configuration. The stamping die can easily be modified such that safety notch 40 is provided in the stamped part, thereby eliminating the need for a secondary manufacturing step. While the stamped part is a preferred application for the safety notch 40, the present invention is not limited to a coupling element 30 manufactured in such a manner. The safety notch 40 may be provided in coupling elements 30 manufactured from various processes, including but not limited to, molding and machine tooling.

What is claimed is:

1. A shaft coupling element comprising:
    a first portion configured for connection to a shaft having a bolt receiving recess and a second portion configured for connection to a secondary component;
    the first portion comprising first and second spaced apart side walls with a partial cylindrical portion extending therebetween to define a shaft receiving slot, the shaft receiving slot having an axial direction and having an axial opening into the shaft receiving slot and the partial cylindrical portion having opposite ends in the axial direction;
    a through bore extending through the first and second walls for receiving a bolt extending through the through bore in the first and second walls and engaging the bolt receiving recess when the shaft is completely inserted into the shaft receiving slot; and
    a safety notch extending entirely through one of the opposite ends of the partial cylindrical portion adjacent the axial opening into the shaft receiving slot so as to define a radial opening extending from the shaft receiving slot entirely through the cylindrical portion in a direction transverse to the axial direction, such that the shaft can pass through the radial opening in a radially outward direction when the shaft is not completely inserted into the shaft receiving slot, such that the bolt is not in engagement with the bolt receiving recess.

2. The shaft coupling element of claim 1 wherein the through bore is at an axial distance (B) from the axial opening into the shaft receiving slot and the safety notch has an axial length (S) that is larger than the distance (B).

3. The shaft coupling element of claim 1 wherein the through bore is at an axial distance (B) from the axial opening into the shaft receiving slot, the safety notch has an axial length (S), and the shaft has a forward chamfer having an axial length (C), wherein the safety notch axial length (S) in combination with the chamfer axial length (C) is larger than the distance (B).

4. The shaft coupling element of claim 1 wherein the shaft receiving slot has a circular configuration.

5. The shaft coupling element of claim 1 wherein the shaft receiving slot has a u-shaped configuration.

6. The shaft coupling element of claim 1 wherein the second portion includes a yoke having spaced apart arms with a securement bore extending therethrough.

* * * * *